United States Patent [19]

Wolff et al.

[11] Patent Number: 5,327,486

[45] Date of Patent: Jul. 5, 1994

[54] METHOD AND SYSTEM FOR MANAGING TELECOMMUNICATIONS SUCH AS TELEPHONE CALLS

[75] Inventors: Richard S. Wolff, West Caldwell; Warren S. Gifford, Holmdel; Michael Kramer, Bronx; David S. Miller, Bedminster; Gerardo Ramirez, Bridgewater; David L. Turock, Highland Park, all of N.J.

[73] Assignee: Bell Communications Research, Inc., Livingston, N.J.

[21] Appl. No.: 45,005

[22] Filed: Mar. 22, 1993

[51] Int. Cl.$^5$ .......................................... H04M 11/00
[52] U.S. Cl. ....................................... 379/96; 379/58; 379/142; 379/210; 379/211; 379/214
[58] Field of Search .................... 379/57, 56, 58, 59, 379/63, 96, 97, 98, 94, 95, 93, 142, 211, 212, 214, 210; 340/825.44

[56] References Cited

U.S. PATENT DOCUMENTS

| | | | |
|---|---|---|---|
| 4,313,035 | 1/1982 | Jordan et al. | 179/18 BE |
| 4,940,963 | 7/1990 | Gutman et al. | 379/57 |
| 4,961,216 | 10/1990 | Baehr et al. | 379/57 |
| 4,994,797 | 2/1991 | Breeden | 379/57 |
| 4,996,707 | 2/1991 | O'Malley et al. | 379/88 |
| 5,007,076 | 4/1991 | Blakley | 379/88 |
| 5,029,196 | 7/1991 | Morganstein | 379/142 |
| 5,228,073 | 7/1993 | Smith | 379/57 |
| 5,241,303 | 8/1993 | Register et al. | 340/706 |

Primary Examiner—Curtis Kuntz
Assistant Examiner—Stella L. Woo
Attorney, Agent, or Firm—Leonard Charles Suchyta

[57] ABSTRACT

A method and system for managing telephone calls includes a personal telephone manager (PTM) (12) and uses out-of-band, wireless, two-way signaling, messaging and alerting to screen, control, route and respond to incoming telephone calls and to communicate called party text messages in auditory form to the caller. Through use of an out-of-band signaling/messaging path (16), the PTM (12) frees the called party from the need to maintain telephone network connectivity, from having to inform others of his/her current location, and from having to subscribe to and use cellular telephone service. Instead, the called party can rely on the availability of existing low bandwidth, wide area, two-way wireless data services, which make efficient and cost effective use of available radio spectrum. Two-way wireless data messaging to a portable computer (18) equipped with radio transceivers is also provided. This feature enables the system to provide a set of real-time options including: call screening by the called party based on information identifying the caller's telephone number; call redirection to a wire-line or wireless telephone number as specified by the called party; call redirection to a third party or to a voice mail system; or the return of a text message specified by the called party and delivered to the caller in an auditory form.

40 Claims, 5 Drawing Sheets

METHOD AND SYSTEM FOR MANAGING TELECOMMUNICATIONS SUCH AS TELEPHONE CALLS

TECHNICAL FIELD

This invention relates to method and system for managing telecommunications and, in particular, to a method and system for managing telephone calls utilizing two-way wireless or wireline messaging.

BACKGROUND ART

The substantial increase in the use of pagers, car phones, cordless telephones, and other wireless personal communication devices testifies to the fact that mobile communications is perceived by many to be an essential element of life in the 1990's. However, even with these devices, many people are still effectively out of reach because callers do not know which of their many numbers to call.

Communications service providers have proposed a personal number calling or PNC solution to this problem: a personal phone with a single number. The interworking between the plethora of wireline and wireless networks that is required to allow all people to be reached regardless of their location will take a number of years to accomplish.

In the short-term (i.e., the next one to five years), a number of interim solutions to this personal mobility problem are anticipated that will use adjunct processors and the existing wireline and wireless communications infrastructure to achieve the desired end-user functionality. In the longer term, some of these features will be incorporated into the public switched network through the Advanced Intelligent Network (AIN), and into PBXs and other switches through software additions.

The issue of obtaining a physical connection between caller and called party is not the only problem that must be addressed. Informal research on user attitudes about personal communications has revealed that the idea of being accessible 24 hours a day, 7 days a week to anyone that knows your personal number is an anathema to even the most enthusiastic embracers of new technology. The problem: answering the phone can be a waste of time and even annoying when you are interrupted from something more important. This is one of the objectives of Personal Communications Networks, e.g. "The difference with PCN will be the ability to maintain control without losing calls, screening them in real time so that important calls get through while others are deferred, but none are actually lost." Thus, the problem is how does one allow people to be reachable anywhere and any time, but only by those individuals that they want to reach them?

Studies of highly mobile individuals (e.g., sales people, doctors) show that a good secretary or receptionist is the currently favored solution. However, good receptionists are hard to find, relatively expensive to employ and not on duty 24 hours a day.

SUMMARY OF THE INVENTION

An object of the present invention is to provide a knowledge-based method and system that automates the receptionist functionality—specifically, the ability to make and receive calls on behalf of a called party, and the ability to intelligently screen and route calls in real-time to a highly mobile called party while also allowing the called party to return a message such as a text message.

Another object of the present invention is to provide a method and system which:
 determines the name of the person calling;
 makes a judgment on whether this call is of sufficient importance that the person being called, the called party, should be notified that there is a call waiting and, if so;
 locate the client (at work, in his or her car, at home, etc.) and relay the name of the caller; and
 carry out the called party's wishes by the use of out-of-band, two-way messaging: connect the call, route to a colleague, or take a message.

Still another object of the present invention is to provide a method and system which answers the telephone promptly, is courteous, provides accurate information to the caller and the called party, does not keep callers waiting for any appreciable time and performs the requested actions reliably by the use of out-of-band, two-way messaging.

Yet still another object of the present invention is to provide a method and system which performs directory lookup and call transfer services when the called party is traveling by the use of out-of-band, two-way messaging.

In carrying out the above objects and other objects of the present invention, a method is provided for managing telecommunications such as a telephone call from a caller to an end user. The method includes the step of receiving the telephone call from the caller. The telephone call includes caller identification information. The method also includes the steps of transmitting a first radio signal based on the caller identification information to a computer having a display screen and receiving the first radio signal. In addition, the method includes the steps of presenting a first message identifying the caller and displaying objects on the display screen. Each object represents a function which may be performed by the user in response to the call. The method further includes the step of receiving user selecting data. The user selecting data represents a selection of one of the objects by the end user to identify the function to be performed in response to the call. Finally, the method includes the steps of transmitting a second radio signal representing a second message identifying the function to be performed, and processing the second message in response to said second radio signal to perform the function identified.

Preferably, the second message includes a text message and wherein the method further comprises the step of converting the text message to a speech message so that the caller can hear the speech message.

Further in carrying out the above objects and other objects of the invention, a system is provided for carrying out each of the above method steps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Overview Of The Method And System

The method and system of the present invention manages telecommunications between a called party and a calling party through the use of an out-of-band, wireless, two-way signaling, messaging and alerting. In this way, the method and system enables a nomadic called party to screen, select, and receive calls and exchange messages with callers independent of location.

Figure 1:
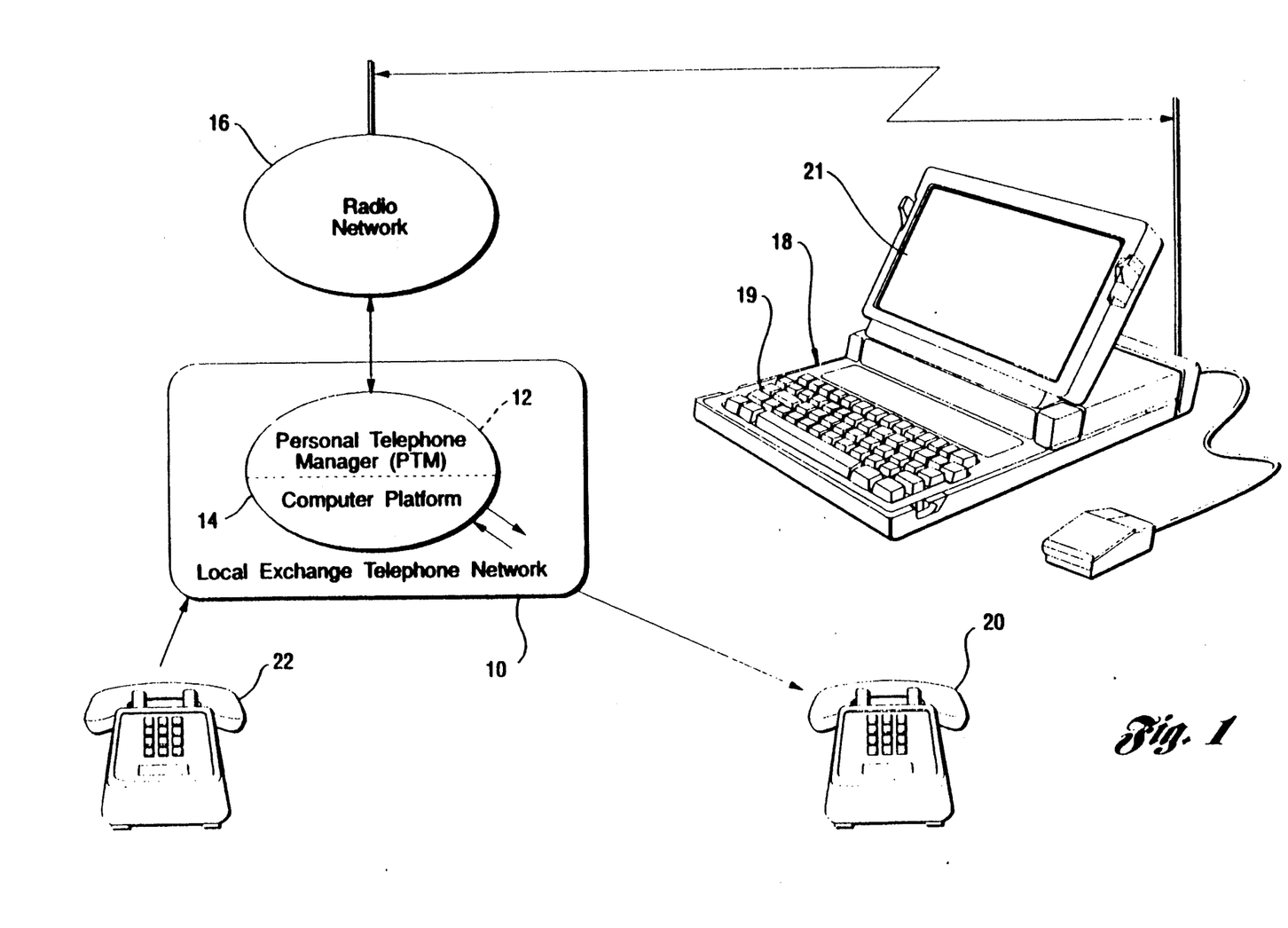
FIG. 1 is a schematic diagram illustrating the system of the present invention.

As illustrated in FIG. 1, the system operates in combination with a public local exchange telephone network 10, a software application program called a personal telephone manager 12 (PTM) which runs on a computer platform 14, a radio network 16 such as the RAM Mobile Data wireless network, a radio modem (not shown) such as the GE-Ericsson Mobidem, and a palm-top computer 18, such as the Fujitsu Personal Systems PoqetPad or Poqet Prime. The called party, through use of the palm-top personal computer 18 equipped with wireless communication capability, can be alerted of incoming telephone calls and selectively route the calls to a telephone 20 to his or her current location.

Figure 2:
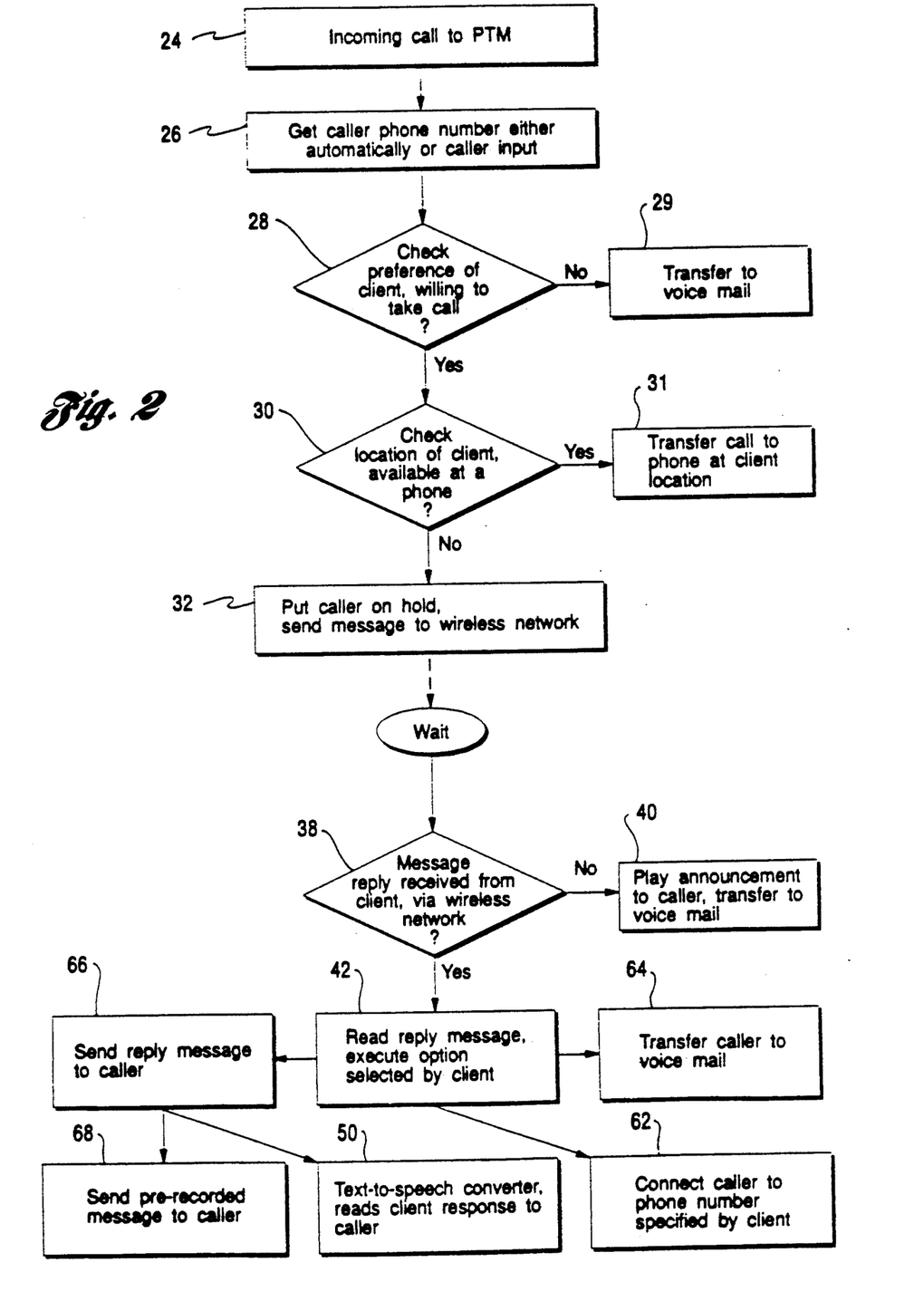
FIG. 2 is a block diagram flow chart illustrating the personal telephone manager (PTM) of the present invention.

FIG. 1, in combination with FIG. 2, depict how telephone calls initiated at a telephone 22 are processed and routed to the called party or end user. A call to the end user is routed by the public local exchange network 10 to the platform 14 where it is processed by the PTM 12.

Upon receiving an incoming call at block 24, the PTM 12 reads and decodes automatic number identification information at block 26 and consults the end user's personal data base to translate the calling number information into the name of the caller. In the event that calling number information cannot be obtained (e.g. call from outside the local calling area or a call block feature is invoked on the caller's line), the PTM 12 permits the caller to enter his or her number using the keypad on the telephone 22, followed by the "#" symbol.

The PTM 12 then attempts to locate the end user and alert him/her of the incoming call after the calling party is first screened against a personal profile, at block 28, maintained in the database. If the decision is made not to make the connection, at block 28, the calling party is connected to voice mail or messaging at block 29. If the end user is not available at his/her normal wireline phone, at block 30, a decision is made whether or not to try to locate the called party based on the personal profile.

At block 30, the location of the end user is checked and if the end user is available thereat, the call is transferred at block 31. If the end user is not available at a phone, at block 32, the calling party is put on hold.

Figure 3:
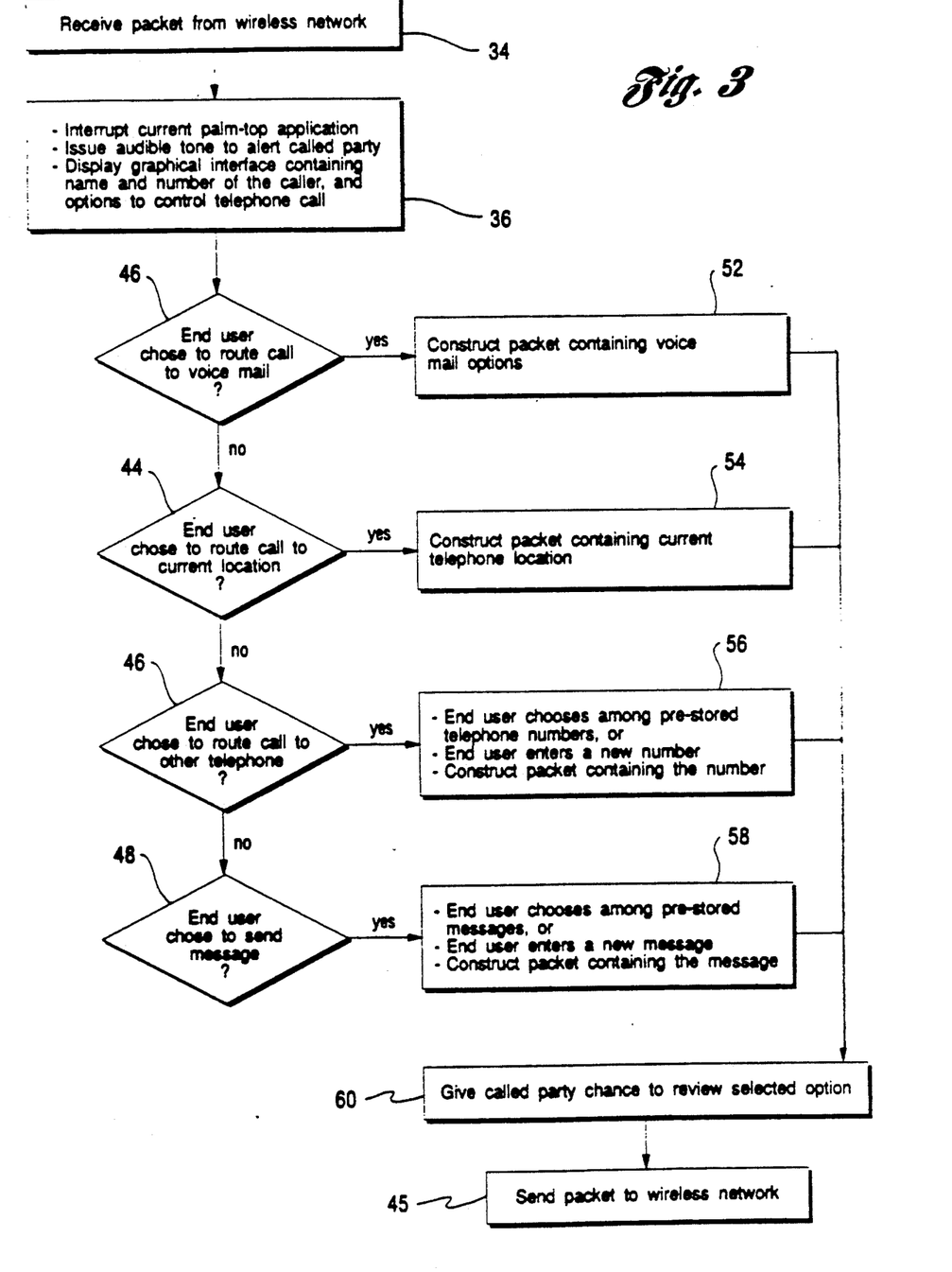
FIG. 3 is a block diagram flow chart illustrating the palm-top application program of the present invention.
Figure 5:
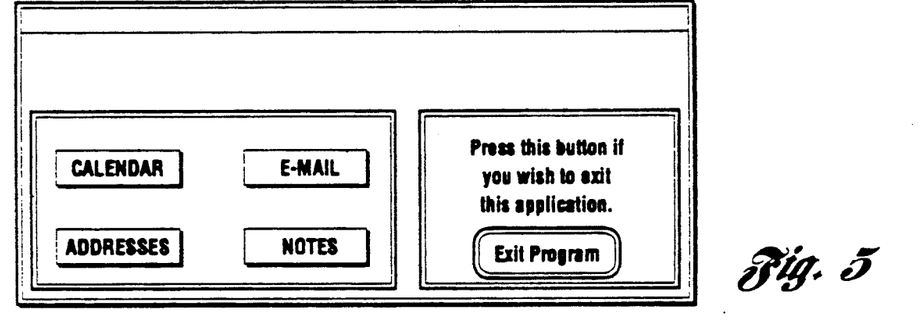
FIG. 5 is a schematic view illustrating a main personal communicator program that may be run on the palm-top computer while the unit is awaiting incoming telephone management messages.

The PTM 12 delivers the caller's name and number to the end user's palm-top computer 18 via the radio network 16 and the Ericsson Mobidem by broadcasting or transmitting this message as indicated at block 32. In particular, software in the PTM 12 constructs a data packet containing information about the caller and the RAM network address of the end user. This packet is sent to the RAM gateway using Internet IP addressing and UDP protocol. The RAM gateway receives the packet from the PTM 12, translates the end user RAM network address to a physical address in the radio network 16, and routes the message packet to the appropriate radio node. The packet is then transmitted via the wireless link protocol and, as indicated at block 34 in FIG. 3, is received by the Ericcson-GE Mobidem, which in turn, alerts the palm-top computer 18 of the arrival of a packet at block 36. At block 36, the current palm-top application is interrupted which may be an application such as those illustrated on the screen of FIG. 5.

At block 38 in FIG. 2, a determination is made as to whether a return message is received. If it wasn't received, then block 40 is entered where an announcement is played to the caller and the call is transferred to voice mail. If received, block 42 is entered.

Figure 4:
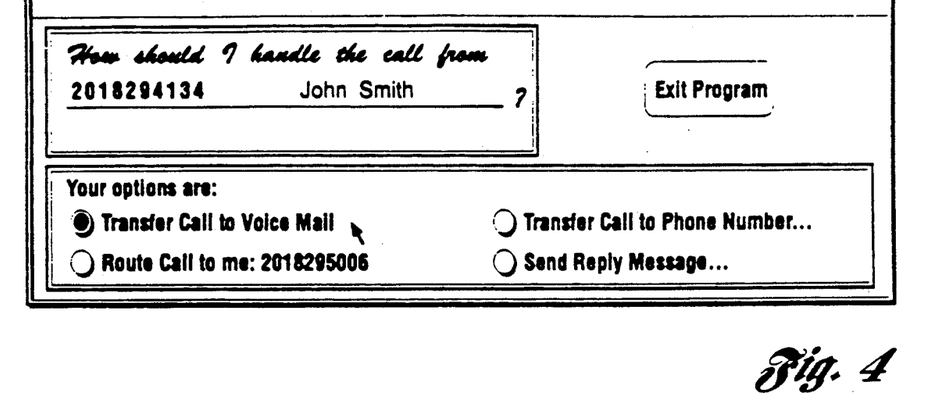
FIG. 4 is a schematic view of a call announcement screen on the palm-top computer of the present invention.

The palm-top based application program responds to the arrival of the packet by issuing an alerting tone and displaying the name and number of the caller to the end user as indicated at block 36 in FIG. 3 and as illustrated in FIG. 4. Also, the options to control the telephone call are displayed on the computer 18. In other words, the palm-top based application program on the computer 18 displays the name and number of the caller to the end user, who can use the information to decide how to respond to the call.

As described in detail herein below, the called party selects a desired response or reply message in response to prompts generated by the palm-top application program. The response message may include a telephone number, text and/or a name. At block 44, the called party transmits the response message back to the radio network 16 which, in turn, communicates the response message to the PTM 12. At block 42 in FIG. 2, the PTM 12 reads the attempts to carry out any commands in the response message.

Figure 6:
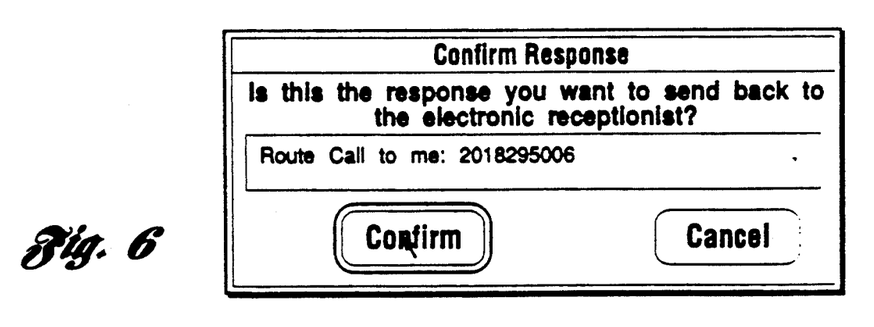
FIG. 6 is a schematic view of a confirmatory screen of the palm-top computer and a second message.
Figure 7:
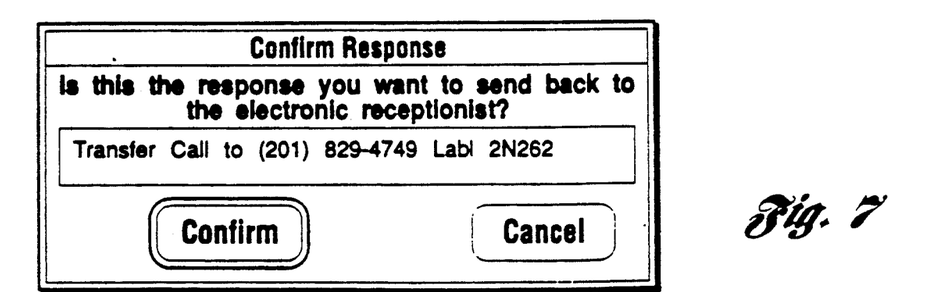
FIG. 7 is a schematic view of a confirmatory screen of the palm-top computer and a second message.
Figure 8:
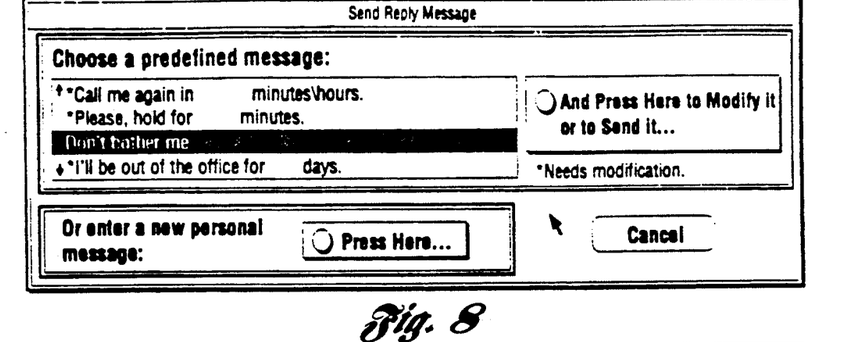
FIG. 8 is a schematic view of a reply message entry screen of the palm-top computer.
Figure 9:
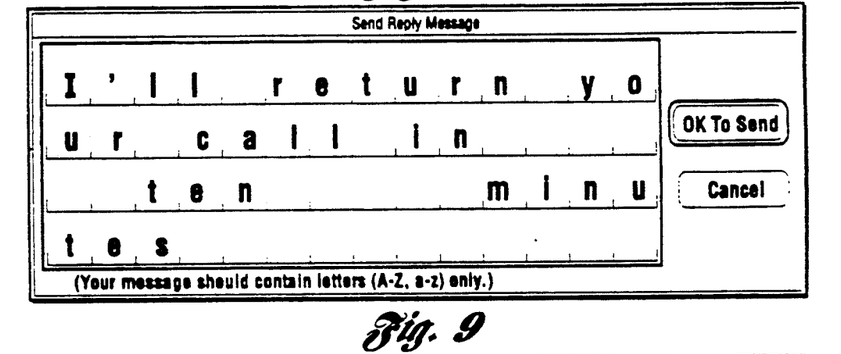
FIG. 9 is a schematic view of a personal message screen of the palm-top computer.

The end user's options include:

Send a message back to the PTM 12 with routing instructions such as illustrated on the screen of FIG. 6 (e.g. "route the call to my current location"), and the PTM 12 will connect the caller to the phone 20 at the user's current location as indicated at block 44, or Send a message back instructing the PTM 12 to reject the call (not shown), or Send a message back instructing the PTM 12 to route the call to voice mail as indicated at block 46, or Send a message back instructing the PTM 12 to route the call to a different person such as illustrated on the screen of FIG. 7 (e.g., the user's secretary) and as indicated at block 47, or Send a text message back to the caller with special instructions (e.g., "Call me back in 15 minutes") as indicated at block 48 and the screens of FIGS. 8 and 9. If this option is used, the PTM 12 converts the reply message from text to speech as indicated at block 50 in FIG. 2, so the caller can hear it.

For each of these options, the end user interacts with the palm-top computer 18 either by entering information via a keyboard 19 in response to a menu on the palm-up display screen 21, or through use of a stylus input tool in response to graphical prompts displayed on the palm-top screen 21. In either case, the application software in the palm-top computer 18 captures the end user's input and constructs a packet for transmission back to the PTM 12 via the radio network 16 as indicated at corresponding blocks 52, 54, 56 and 58 in FIG. 3. The application software addresses the reply packet to the caller in such a way that it is routed by the radio network 16 to the Internet gateway, where the appropriate IP address is used to route the packet to the PTM 12. When the reply packet is received by the PTM 12, the message is processed and the instructions of the end user are executed as indicated at block 42 of FIG. 2.

As indicated at block 60 in FIG. 3 and the screens of FIGS. 6 and 7, the called party is given the chance to review a selected option before the constructed packet is sent to the wireless network 16 as indicated at block 45.

Figure 10:
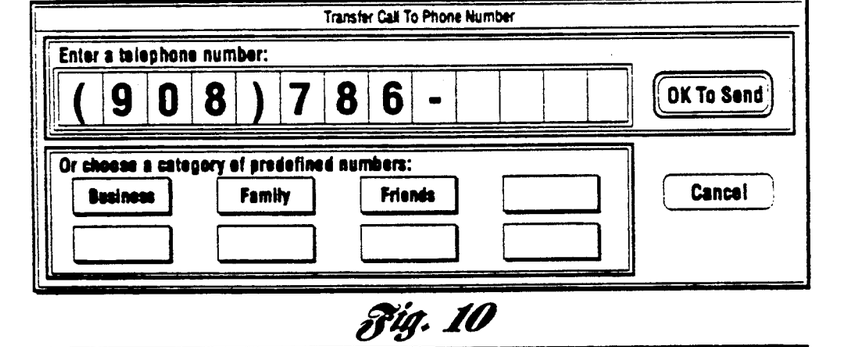
FIG. 10 is a schematic view of a transfer screen of the palm-top computer.

If the user decides to accept the call, the PTM, through the platform 14, will instruct the local exchange network 10 to dial the number associated with the user's current location, and connect the caller and user as indicated at block 62 in FIG. 2. As illustrated in FIG. 10, the telephone number of the end user's current location is entered into the palm-top computer 18 and provided to the PTM 12 in the message carried on the radio network 16.

In the event that the end user elects to reject the call, the caller will be told by the PTM 12 through use of a stored audio message that the user is not available.

If the end user selected the voice mail option, the PTM 12 will transfer the caller to the end user's voice mail system as indicated at block 64.

Figure 11:
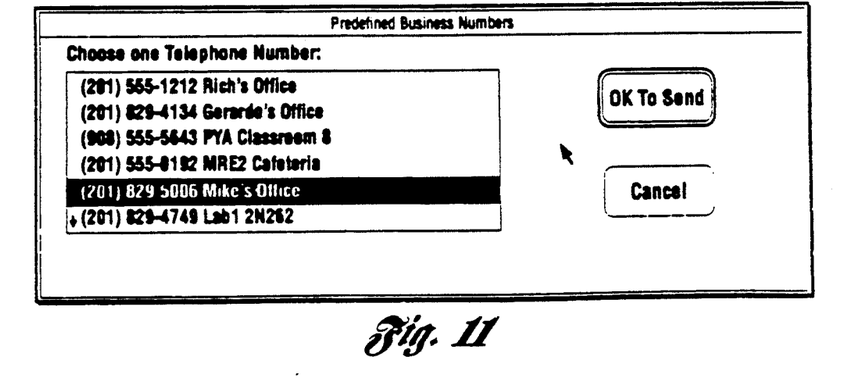
FIG. 11 is a schematic view of a transfer call address book of the palm-top computer.

As also indicated at block 62 and in FIG. 11, if the end user decides to re-route the caller to another number, the end user can either provide the PTM 12 with the number of the call designation, or with the name of the designated recipient (e.g., "my secretary") and the PTM 12 will access information stored in the end user's personal profile to determine the appropriate routing number.

A data base containing information records of frequently called numbers (i.e. personalized phone book) may be provided. A number from the data base can be selected as a destination number for the transfer of the call.

Finally, if the end user chooses to send the caller a message as indicated at block 66, he/she can (a) choose among several pre-recorded messages (recorded in a human voice and stored in the PTM 12), as indicated by block 68 FIG. 8 or (b) as indicted by FIG. 9, enter a message on the palm-top computer 18 that will be transmitted over the radio network 16, converted to speech by the PTM 12, and delivered to the caller by the local exchange telephone network 10 as indicated at block 50.

As described above, the palm-top computer 18 alerts the end user and supports the interactions needed to screen and route incoming calls. The palm-top application program interfaces to the GE-Ericsson Mobidem, exchanging messages to and from the radio network 16, and also interfaces with the end user. The application supports two types of user input interfaces: key board input and stylus input.

End user application programs for key board and stylus-based palm-top computers operate similarly. A message received by the Mobidem is processed by the palm-top application program, which provides the end user with a graphical display and an audible tone announcing the incoming call. The call announcement screen for the stylus-based palm-top, shown in FIG. 4, advises the end user of the name and number of the caller and provides prompts for the various call disposition options (e.g., "route call to me", "transfer call to voice mail", etc.).

The end user selects an option (either using the stylus of the pen-based palm-top computer or key strokes on the key board based palm-top computer 18), and the application then provides the graphical screen appropriate for the selection. For the stylus-based palm-top computer, selection of each response option results in a new graphical display. If the end user selects the option "transfer call to phone number . . . ", the application provides choices including selection of the routing number from a library of pre-stored numbers as illustrated in FIG. 11 or the entry of the number associated with the end user's current location. If the end user chooses to enter a number, either the key board or the stylus can be used. For stylus-based input, the palm-top computer uses handwriting recognition to convert the input to standard machine readable (ASCII) format and display the converted information to the end user before sending it back to the PTM 12 as illustrated in FIG. 10. Furthermore, the "Forward Call to" option can be used to update the last user location.

If the end user elects to send a reply message, the application offers the option of choosing between several predefined messages as illustrated in FIG. 8 or entry of a new personal message as illustrated in FIG. 9. The end user can create and store predefined messages with variable parameters (e.g., "call me back in X minutes") and enter the parameter value in response to the incoming call. This feature provides convenience for frequently used responses.

Other response options result in similar interactions with the end user. In all cases, the end user is prompted on what actions can be taken and also given the opportunity to review the selected response, make changes, or cancel the reply as illustrated in FIGS. 6 and 7.

The specific implementation described above is limited in functionality by the availability of commercial networks and terminal equipment. The PTM 12 may exploit emerging technologies to overcome a variety of limitations. Improvements suggested by experience with the current implementation include:

1. Integration of the radio modem and the palm-top computer 18. As described above, the radio modem and the palm-top computer 18 are separate units. A more suitable implementation would be achieved by including the radio modem in the palm-top computer 18 and reducing the size of the combined unit to fit in the end user's pocket or purse.

2. Use of alternative radio networks. In the present system, wireless connectivity is preferably provided by the RAM network. A more optimal implementation would allow the end user to communicate with the PTM 12 via alternative wireless network providers. The PTM 12, the radio modem and the application software in the user terminal would be agile and capable of responding to different protocols.
3. Use of speech-to-text conversion or voice recognition, such as template matching, to identify the caller. As described above, the PTM 12 identifies the caller by calling number, provided either by the local exchange network 12 or explicitly keyed in by the caller. A more optimal implementation would enable the caller to speak to the PTM 12 and the information would be translated to text for call screening either by the PTM 12 or for transmission as text to the end user.
4. Use of speech-to-text conversion for end user response to the PTM/caller. As described above, the end user responds to calls by keyboard or stylus. A more optimal implementation would enable the end user to respond to calls by issuing verbal commands to the palm-top computer 18, which would translate these to text or speech messages for packet transmission.
5. End user profile management. As described above, the end user can modify his/her service profile (used by the PTM 12 to screen and redirect calls) by either entering instructions via the key pad of a wireline telephone or by using a computer terminal. A more optimal implementation would enable the end user to modify the service profile via the palm-top computer 18.
6. Security features. As described above, the messages transmitted over the radio network 16 are not encrypted. A more optimal implementation would insure privacy through the use of message encryption. A more optimal implementation would also include validation procedures in which the palm-top computer 18 would validate itself to the network 16 (e.g., use of a password or a public key) and the end user would also be validated through a public or private key technique or through speaker recognition techniques.
7. Alerting features. As described above, the palm-top computer 12 alerts the end user of an incoming call with an audible tone. A more optimal implementation would provide less intrusive alternatives such as a flashing light or icon, or a vibration.
8. Caller voice clip transmission. As described above, only the telephone number and the name of the calling party is sent to the palm-top computer. A more optimal implementation is to forward a voice clip from the caller which describes the nature and subject of the call. This can be digitized by the system and sent in a digitally encoded form over the radio network and connected to audio and played back over a speaker on the palm-top computer.
9. Using various palm-top computer platforms and operating systems. The system is described using a particular palm-top computer and operating system. More optimal implementation would include the use of other palm-top computer platforms and operating systems.
10. Using various handwriting recognition systems. As described above, the palm-top computer uses a particular handwriting recognition system to enable the end user to enter numbers and text messages. In a more optimal implementation, other more efficient and accurate handwriting recognition techniques, including electronic ink techniques, could be used to enter and transfer information.
11. Radio Link Protocols. As described above, the wireless data network provided reliable TCP/IP datagram service between the data gateway and the portable client terminal. The packet size was variable, ranging form one to 512 bytes of payload. The connection between the PTM platform and the data gateway was implemented using a dial-up SLIP connection. The packet drive software provided encapsulation of the TCP/IP packets in the lower-layer packets transmitted across the wireless access link. A more optimal implementation would utilize protocols that are well-matched to the inherent characteristics of the radio network. Future mobile data services need to be designed to accommodate to the delay and error characteristics of radio links, and TCP protocols must be made "wireless-data" aware.
12. Portable terminal application software. As described above, the palm-top computer application software was written to operate in the DOS 3.0 environment. In a more optimal implementation, the end user application software would be written to operate independent of the specific operating system of the palm-top computer.
13. Portable terminal software state. As described above, the end user terminal application was running in the foreground. In a more optimal implementation, the end user terminal application would be one that "sleeps" as a background process, while waiting for packets, and that alerts the end user only when a packet arrives. The end user would then be able to use other applications normally when there are no telephone calls to be managed. This can be readily accomplished by implementing the PTM application as a Terminate-and-Stay-Resident (TSR) program.

While the best mode for carrying out the invention has been described in detail, those familiar with the art to which this invention relates will recognize various alternative designs and embodiments for practicing the invention as defined by the following claims.

What is claimed is:

1. Method for managing a telecommunications call in a telecommunications network from a caller to an end user, the method comprising the steps of:
receiving the call from the caller, the call including call identification information;
screening the call based on the caller identification through automated access to a data base; then
transmitting a first radio signal based on the caller identification information to a computer having a display screen which computer is locationally independent of the telecommunications network;
receiving the first radio signal;
presenting a first message identifying the caller and displaying objects on the display screen, each object representing a function which may be performed by the user in response to the call;
receiving user selection data representing a selection of one of the objects by the end user to identify the function to be performed in response to the call;
transmitting a second radio signal representing a second message identifying the function to be performed;

processing the second message in response to said second radio signal; and performing the identified function in the telecommunications network.

2. A method as claimed in claim 1 in which the telecommunications call is a telephone call.

3. The method as claimed in claim 1 further comprising the step of providing an input device for inputting data to the computer.

4. The method as claimed in claim 3 wherein the input device is a pointing device for inputting text data in human readable format to the computer through the display device and for selecting the objects displayed on the display screen.

5. The method as claimed in claim 4 further comprising the steps of converting the text data to a machine readable format and displaying the converted data on the display screen.

6. The method as claimed in claim 3 wherein the input device is a keyboard.

7. The method as claimed in claim 1 wherein at least one of the first and second messages is a text message.

8. The method as claimed in claim 1 wherein the second message includes a telephone number for routing the call to a telephone identified by the telephone number.

9. The method as claimed in claim 8 wherein the telephone number is a current wireline telephone number of the end user.

10. The method as claimed in claim 9 wherein the method further includes the step of storing the current wireline telephone number in a user profile for later use.

11. The method as claimed in claim 1 wherein the second message includes rejection instructions for rejecting the call.

12. The method as claimed in claim 1 wherein the second message includes routing instructions to route the call to a messaging service, such as voice mail.

13. The method as claimed in claim 1 wherein the second message includes routing instructions for routing the call to an individual, other than the end user.

14. The method as claimed in claim 1 wherein the first radio signal which represents the first message identifies the caller.

15. The method as claimed in claim 1 further comprising the step of alerting the end user of the reception of the first radio signal.

16. The method as claimed in claim 1 wherein the second message includes a text message and wherein the method further comprises the step of converting the text message to a speech message to permit the caller to hear the speech message.

17. The method as claimed in claim 1 wherein at least one of the objects is a graphic object.

18. The method as claimed in claim 1 further comprising the step of identifying the caller from the caller identification information.

19. A system for managing a telecommunications call in a telecommunications network from a caller to an end user, the system comprising:
means for receiving the call from the caller, the call including caller identification information;
means for identifying the caller from the caller identification information and means for screening the call based on the caller identification information to obtain a first message;
a first transceiver for transmitting to said end user a first radio signal based on the caller identification information;

a second transceiver at said end user for receiving the first radio signal;
a computer, locationally independent of the telecommunications network, with a display device connected to the second transceiver and having a display screen and an input device for inputting data to the computer;
means for presenting the first message identifying the caller and means for displaying objects on the display screen, each object representing a function which may be performed in response to the call;
means for receiving user selection data from the input device, the user selection data representing a selection of one of the objects by the end user to identify the function to be performed with respect to the call, the second transceiver transmitting to the first transceiver a second radio signal representing a second message identifying the function to be performed; and
means for processing the second message in order to perform, in the telecommunications network, the function identified by the second message.

20. A method as claimed in claim 19 in which the telecommunications call is a telephone call.

21. The system as claimed in claim 19 wherein the input device is a pointing device for inputting text data in human readable format to the computer through the display device and for selecting the objects displayed on the display screen.

22. The system as claimed in claim 21 further comprising means for converting the text data to a machine readable format and means for displaying the converted data on the display screen.

23. The system as claimed in claim 19 wherein the input device is a keyboard.

24. The system as claimed in claim 19 wherein at least one of the first and second messages is a text message.

25. The system s claimed in claim 19 wherein the second message includes a telephone number and routing instructions for routing the call to a telephone identified by the telephone number.

26. The system as claimed in claim 19 wherein the second message includes rejection instructions for rejecting the call.

27. The system as claimed in claim 19 wherein the second message includes routing instructions for routing the call to a messaging service, such as voice mail.

28. The system as claimed in claim 19 wherein the second message includes routing instructions for routing the call to an individual, other than the end user.

29. The system as claimed in claim 19 wherein the second message includes a text message and wherein the system further comprises means for converting the text message to a speech message so that the caller can hear the speech message.

30. The system as claimed in claim 19 wherein the means for identifying includes a data base of information records denoting the names of potential callers.

31. The system as claimed in claim 19 further comprising means for alerting the end user that the first radio signal has been received by the second transceiver.

32. The system as claimed in claim 19 wherein at least one of the objects is a graphic object.

33. A method for managing a telecommunications call from a caller to an end user, the method comprising the steps of:

receiving the call from the caller, the call including caller identification information;

transmitting a first radio signal based on the caller identification information to a computer having a display screen;

receiving the first radio signal;

presenting a first message identifying the caller and displaying objects on the display screen, each object representing a function which may be performed by the user in response to the call;

selecting one of the objects by the end user to identify the function to be performed in response to the call;

transmitting a second radio signal representing a second message identifying the selected function to be performed, wherein the second message includes a telephone number for routing the call to a telephone identified by the telephone number and the telephone number is the current wireline number of the end user; and processing the second message in response to said second radio signal to perform the selected function.

34. The method as claimed in claim 33 wherein the method further includes the step of storing the current wireline telephone number in a user profile for later user.

35. A system for managing a telecommunications call from a caller to an end user, the method comprising:

means for receiving the call from the caller, the call including caller identification information;

means for identifying the caller from the caller identification information and means for screening the call, based on the caller identification information to obtain a first message;

a first transceiver for transmitting to said end user a first radio signal based on the first message;

a second transceiver at said end user for receiving the first radio signal;

a computer with a display device connected to the second transceiver and an input device for inputting data to the computer;

means for presenting the first message identifying the caller and for displaying functions which may be performed in response to the call;

means for receiving end user selection data from the input device, the end user selection data representing a selection of the functions to be performed with respect to the call, the second transceiver transmitting to the first transceiver a second radio signal representing a second message identifying the function to be performed; and means for processing the second message to perform the selected function identified.

36. The system as claimed in claim 35 in which the telecommunications call is a telephone call.

37. The system as claimed in claim 35 wherein the second message includes a text message and wherein the system further comprises means for converting the text message to an audible message.

38. A system for managing a telecommunications call from a caller to an end user, the system comprising:

means for receiving the call from the caller, the call including caller identification information;

means for creating a first message to identify the caller in response to the caller identification information;

a first transceiver for transmitting to said end user a first radio signal based on the first message;

a second transceiver at said end user for receiving the first radio signal;

a computer with a display device connected to the second transceiver and an input device for inputting data to the computer;

means for presenting the first message and for displaying objects on the display screen, each object representing a function which may be performed in response to the call;

means for receiving user selection data from the input device, the user selection data representing a selection of the function to be performed with respect to the call, the second transceiver transmitting to the first transceiver a second radio signal representing a second message identifying the function to be performed, wherein the second message includes a telephone number and routing instructions for routing the call to a telephone identified by the telephone number.

means for processing the second message to perform the selected function.

39. The system as claimed in claim 38 wherein the telecommunication call is a telephone call.

40. The system as claimed in claim 38 wherein the second message includes routing instructions for routing the call to an individual other than the end user.

* * * * *

UNITED STATES PATENT AND TRADEMARK OFFICE
CERTIFICATE OF CORRECTION

PATENT NO. : 5,327,486

DATED : July 5, 1994

INVENTOR(S) : Richard S. Wolff, Warren S. Gifford, Michael Kramer, David S. Miller, Gerardo Ramirez, and David L. Turock It is certified that error appears in the above-identified patent and that said Letters Patent is hereby corrected as shown below:

On the cover page, item [75], change "Inventors: Richard S. Wolff, West Caldwell; Warren S. Gifford, Holmdel; Michael Kramer, Bronx; David S. Miller, Bedminster; Gerardo Ramirez, Bridgewater; David L. Turock, Highland Park, all of N.J." to read --Richard S. Wolff, West Caldwell, N.J.; Warren S. Gifford, Holmdel, N.J.; Michael Kramer, Bronx, N.Y.; David S. Miller, Bedminster, N.J.; Gerardo Ramirez, Bridgewater, N.J.; David L. Turock, Highland Park, N.J.--.

Signed and Sealed this

Fourteenth Day of March, 1995

*Attest:*

BRUCE LEHMAN

*Attesting Officer*      *Commissioner of Patents and Trademarks*